(12) United States Patent
Keshavarz et al.

(10) Patent No.: US 8,394,529 B2
(45) Date of Patent: Mar. 12, 2013

(54) PREPARATION OF FLOW CELL BATTERY ELECTROLYTES FROM RAW MATERIALS

(75) Inventors: Majid Keshavarz, Pleasanton, CA (US); Aravamuthan Varadarajan, Fremont, CA (US)

(73) Assignee: Deeya Energy, Inc., Fremont, CA (US)

( * ) Notice: Subject to any disclaimer, the term of this patent is extended or adjusted under 35 U.S.C. 154(b) by 257 days.

(21) Appl. No.: 12/790,595

(22) Filed: May 28, 2010

(65) Prior Publication Data

US 2011/0070483 A1 Mar. 24, 2011

Related U.S. Application Data

(60) Provisional application No. 61/182,073, filed on May 28, 2009.

(51) Int. Cl.
 *H01M 6/04* (2006.01)
(52) U.S. Cl. ........................................ 429/188; 429/189
(58) Field of Classification Search ........................ None
 See application file for complete search history.

(56) References Cited

U.S. PATENT DOCUMENTS

| | | | |
|---|---|---|---|
| 3,540,934 A | 11/1970 | Boeke | |
| 3,607,407 A | 9/1971 | Adams | |
| 3,899,404 A | 8/1975 | Iverson | |
| 3,996,064 A | 12/1976 | Thaller | |
| 4,111,688 A | 9/1978 | Ichijo | |
| 4,133,941 A | 1/1979 | Sheibley | |
| 4,159,366 A | 6/1979 | Thaller | |
| 4,308,324 A | 12/1981 | Newman | |
| 4,309,372 A | 1/1982 | Sheibley | |
| 4,312,735 A | 1/1982 | Grimes et al. | |
| 4,414,090 A | 11/1983 | D'Agostino et al. | |
| 4,454,649 A | 6/1984 | Jalan et al. | |
| 4,468,441 A | 8/1984 | D'Agostino et al. | |
| 4,485,154 A | 11/1984 | Remick et al. | |
| 4,496,637 A | 1/1985 | Shimada et al. | |
| 4,543,302 A | 9/1985 | Gahn et al. | |
| 4,579,791 A | 4/1986 | Wang | |
| 4,732,827 A | 3/1988 | Kaneko et al. | |
| 4,784,924 A | 11/1988 | Savinell et al. | |
| 4,814,241 A | 3/1989 | Nagashima et al. | |
| 4,828,666 A | 5/1989 | Iizuka et al. | |
| 4,874,483 A | 10/1989 | Wakabayashi et al. | |
| 4,882,241 A | 11/1989 | Heinzel | |
| 4,894,294 A | 1/1990 | Ashizawa et al. | |

(Continued)

FOREIGN PATENT DOCUMENTS

| | | |
|---|---|---|
| DE | 102006007206 | 10/2006 |
| JP | 52155123 | 12/1977 |

(Continued)

OTHER PUBLICATIONS

Search Report for PCT Application No. PCT/US2009/049285.

(Continued)

*Primary Examiner* — Patrick Ryan
*Assistant Examiner* — Yoshitoshi Takeuchi
(74) *Attorney, Agent, or Firm* — Haynes and Boone, LLP

(57) ABSTRACT

A method for preparing a redox flow battery electrolyte is provided. In some embodiments, the method includes the processing of raw materials that include sources of chromium ions and/or iron ions. The method further comprises the removal of impurities such as metal ions from those raw materials. In some embodiments, an ammonium salt may be used to remove metal impurities from an aqueous mixture of chromium ions and/or iron ions. Further provided is a redox flow battery comprising at least one electrolyte prepared from the above-identified methods.

27 Claims, 2 Drawing Sheets

U.S. PATENT DOCUMENTS

| | | | |
|---|---|---|---|
| 4,929,325 | A | 5/1990 | Bowen et al. |
| 4,945,019 | A | 7/1990 | Bowen et al. |
| 4,948,681 | A | 8/1990 | Zagrodnik et al. |
| 4,956,244 | A | 9/1990 | Shimizu et al. |
| 5,009,868 | A | 4/1991 | Spitz et al. |
| 5,061,578 | A | 10/1991 | Kozuma et al. |
| 5,162,168 | A | 11/1992 | Downing et al. |
| 5,188,911 | A | 2/1993 | Downing et al. |
| 5,258,241 | A | 11/1993 | Ledjeff et al. |
| 5,324,341 | A | 6/1994 | Nagel et al. |
| 5,366,824 | A | 11/1994 | Nozaki et al. |
| 5,403,675 | A | 4/1995 | Ogata et al. |
| 5,458,990 | A | 10/1995 | Ramskogler et al. |
| 5,648,184 | A | 7/1997 | Inoue et al. |
| 5,656,390 | A | 8/1997 | Kageyama et al. |
| 5,665,212 | A | 9/1997 | Zhong et al. |
| 5,759,711 | A | 6/1998 | Miyabayashi et al. |
| 5,851,694 | A | 12/1998 | Miyabayashi et al. |
| 6,005,183 | A | 12/1999 | Akai et al. |
| 6,040,075 | A | 3/2000 | Adcock et al. |
| 6,077,622 | A | 6/2000 | Minohara |
| 6,086,643 | A | 7/2000 | Clark et al. |
| 6,461,772 | B1 | 10/2002 | Miyake et al. |
| 6,475,661 | B1 | 11/2002 | Pellegri et al. |
| 6,509,119 | B1 | 1/2003 | Kobayashi et al. |
| 6,524,452 | B1 | 2/2003 | Clark et al. |
| 6,555,267 | B1 | 4/2003 | Broman et al. |
| 6,562,514 | B1 | 5/2003 | Kazacos et al. |
| 6,692,862 | B1 | 2/2004 | Zocchi |
| 6,759,158 | B2 | 7/2004 | Tomazic |
| 6,761,945 | B1 | 7/2004 | Adachi et al. |
| 6,764,789 | B1 | 7/2004 | Sekiguchi et al. |
| 6,905,797 | B2 | 6/2005 | Broman et al. |
| 6,986,966 | B2 | 1/2006 | Clarke et al. |
| 7,061,205 | B2 | 6/2006 | Shigematsu et al. |
| 7,078,123 | B2 | 7/2006 | Kazacos et al. |
| 7,199,550 | B2 | 4/2007 | Tsutsui et al. |
| 7,220,515 | B2 | 5/2007 | Ito et al. |
| 7,227,275 | B2 | 6/2007 | Hennessy et al. |
| 2002/0112968 | A1 | 8/2002 | Shiroto |
| 2003/0008203 | A1 | 1/2003 | Winter |
| 2004/0170893 | A1 | 9/2004 | Nakaishi et al. |
| 2004/0202915 | A1 | 10/2004 | Nakaishi et al. |
| 2004/0241544 | A1 | 12/2004 | Nakaishi et al. |
| 2005/0074653 | A1 | 4/2005 | Broman et al. |
| 2005/0156431 | A1 | 7/2005 | Hennessy |
| 2005/0156432 | A1 | 7/2005 | Hennessy |
| 2005/0158615 | A1 | 7/2005 | Samuel et al. |
| 2005/0164075 | A1 | 7/2005 | Kumamoto et al. |
| 2005/0181273 | A1 | 8/2005 | Deguchi et al. |
| 2005/0260473 | A1 | 11/2005 | Wang |
| 2007/0072067 | A1 | 3/2007 | Symons et al. |
| 2007/0080666 | A1 | 4/2007 | Ritter et al. |
| 2007/0111089 | A1 | 5/2007 | Swan |
| 2008/0081247 | A1 | 4/2008 | Nakaishi et al. |
| 2008/0193828 | A1 | 8/2008 | Sahu |
| 2009/0218984 | A1 | 9/2009 | Parakulam |
| 2010/0003586 | A1 | 1/2010 | Sahu |
| 2010/0090651 | A1 | 4/2010 | Sahu |
| 2010/0092757 | A1 | 4/2010 | Nair |
| 2010/0092807 | A1 | 4/2010 | Sahu |
| 2010/0092813 | A1 | 4/2010 | Sahu |
| 2010/0092843 | A1 | 4/2010 | Conway |
| 2010/0094468 | A1 | 4/2010 | Sahu |
| 2010/0136455 | A1 | 6/2010 | Winter |
| 2010/0143781 | A1 | 6/2010 | Keshavarz |

FOREIGN PATENT DOCUMENTS

| | | |
|---|---|---|
| JP | 60047373 | 3/1985 |
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | WO9003666 | 4/1990 |
| WO | 03005476 | 1/2003 |
| WO | 2004079849 | 9/2004 |
| WO | 2006135958 | 12/2006 |

OTHER PUBLICATIONS

Search Report for PCT Application No. PCT/US2009/066888.
Office Action for U.S. Appl. No. 12/217,059 mailed Aug. 23, 2010.
Office Action for U.S. Appl. No. 12/577,137 mailed Sep. 7, 2010.
Office Action for U.S. Appl. No. 12/631,749 mailed Aug. 19, 2010.
ISR and Written Opinion for related PCT Application No. PCT/US2010/036767, dated Feb. 25, 2011.
Licht, Stuart et al, "Electrochemical Alkaline Fe(VI) Water Purification and Remediation," *Environ. Sci. Technol.*, vol. 39, 2005, pp. 8071-8076.
Zhang, Pingwei et al., "Recover of Metal Values From Spent Nickel-Metal Hydride Rechargeable Batteries," *Journal of Power Sources*, vol. 77, 1999, pp. 116-122.

US 8,394,529 B2

PREPARATION OF FLOW CELL BATTERY ELECTROLYTES FROM RAW MATERIALS

PRIORITY CLAIM

This application claims the benefit of U.S. Provisional Application No. 61/182,073 entitled "PREPARATION OF FLOW CELL BATTERY ELECTROLYTES FROM RAW MATERIALS" filed on May 28, 2009.

BACKGROUND OF THE INVENTION

1. Field of the Invention

The present disclosure relates to methods for preparing and purifying electrolytes and electrolyte solutions useful in reduction-oxidation (redox) flow cell batteries.

2. Description of the Relevant Art

There is an increasing demand for novel and innovative electric power storage systems. Redox batteries have become an attractive means for such energy storage. In certain applications, a redox flow cell battery or a flow cell battery may include positive and negative electrodes disposed in separate half-cell compartments. The two-half cells may be separated by a porous or ion-selective membrane, through which ions are transferred during a redox reaction. Electrolytes (anolyte and catholyte) are flowed through the half-cells as the redox reaction occurs, often with an external pumping system. In this manner, the membrane in a flow cell battery operates in an aqueous electrolyte environment. In some applications, an iron-ion containing aqueous hydrochloric acid solution may be used as the catholyte, while a chromium-ion containing aqueous hydrochloric acid solution may be used as the anolyte. In some applications, a mixture of chromium and iron containing solutions may be used on both sides of the redox cell. The use of mixed reactants eliminates the requirement for a highly-selective membrane since the composition of both half cells is identical in the discharged state.

In some redox flow batteries, certain metal impurities contained in the electrolyte solution can enhance side reactions at the negative electrode, which can result in the evolution of hydrogen gas that adversely affects the coulombic efficiency of the battery. While the use of high-purity raw materials such as high-grade iron chloride and high-grade chromium chloride can minimize such hydrogen gas-forming reactions, such materials are typically too expensive for use in redox batteries on a commercial scale.

Therefore, there exists a need to develop methods for preparing and purifying electrolyte solutions from inexpensive raw materials. In addition, there exists a need to develop methods of removing impurities from those electrolyte solutions, and, in particular, those impurities associated with the evolution of hydrogen gas and decreased efficiency of the flow cell battery.

Methods for the preparation and purification of electrolyte solution from raw materials are known. For example, one method involves preferential plating of nickel metal on an electrode of a flow battery using lead ions to provide the hydrogen overpotential and aid the process. However, considerable hydrogen evolution still occurs to impede the process. It is desirable to have a chemical method that avoids this problem and is amenable to scale up.

SUMMARY OF THE INVENTION

In an embodiment, a method for preparing a redox flow battery electrolyte is provided. In some embodiments, the method includes the processing of raw materials containing sources of chromium ions and/or iron ions. In some embodiments, those raw materials will also contain impurities such as, for example, sources of certain transition-metal ions. In some embodiments, the method includes the removal of impurities from those raw materials.

In an embodiment, the methods described herein include dissolving a raw material containing sources of certain ionic impurities in an acidic solution. The aqueous solution containing ionic impurities is treated with an ammonium salt. In some embodiments, the ammonium salt is ammonium sulfate.

Removal of certain ionic impurities is effected by the precipitation of those impurities from solution in the form of a salt, formed by the addition of the ammonium salt (e.g., an ammonium double salt). In some embodiments, the double salt is an ammonium sulfate double salt. In some embodiments, the salt of certain ionic impurities is be filtered off, resulting in a redox electrolyte solution containing chromium ions and/or iron ions that is substantially free of impurities.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
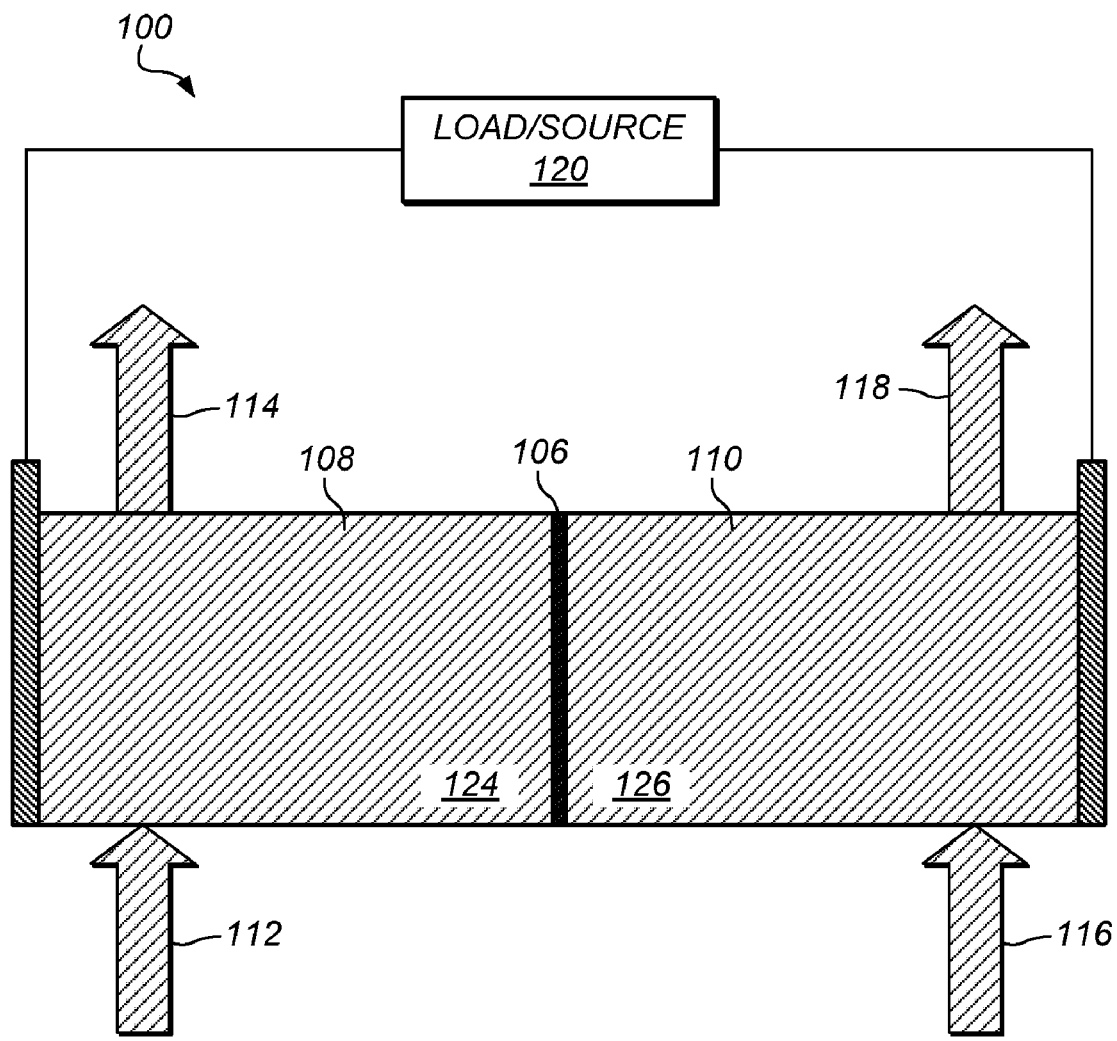
FIG. 1 illustrates a redox flow cell.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise.

As described herein, the term "double salt" refers to a salt the includes more than one cation or anion. Double salts may be formed when more than one salt is dissolved in a liquid, and when together crystallize as a single substance. Some crystallized double salts will dissolve in a liquid (e.g., water) and ionize as two distinct salts. Some double salts may be substantially insoluble and precipitate out of solution.

As described herein, the term "impurities" refers to those materials that deposit under reductive conditions and/or have a low hydrogen overpotential. An example of a low hydrogen overpotential would include materials that evolve hydrogen gas in an aqueous acidic environment.

FIG. 1 illustrates a redox flow cell 100 of a redox flow cell battery according to some of the embodiments described herein. As shown, redox flow cell 100 includes two half-cells 108 and 110 separated by a membrane 106. An electrolyte 124 is flowed through half-cell 108 and an electrolyte 126 is flowed through half-cell 110. Half-cells 108 and 110 include electrodes 102 and 104 respectively, in contact with electrolytes 124 and 126, respectively, such that an anodic reaction occurs at the surface of one of electrodes 102 or 104 and a cathodic reaction occurs at the surface of the other one of electrodes 102 or 104. In some embodiments, multiple redox flow cells 100 can be electrically coupled (e.g., stacked) either in series to achieve higher voltage or in parallel in order to achieve higher current. As shown in FIG. 1, electrodes 102 and 104 are coupled across load/source 120, through which electrolytes 124 and 126 are either charged or discharged. The operation of a flow cell and the composition of a membrane is further described in U.S. patent application Ser. No. 12/217,059, entitled "Redox Flow Cell," filed on Jul. 1, 2008, which is incorporated herein by reference. Construction of a flow cell stack is described in U.S. patent application Ser. No. 12/577,134, entitled "Common Module Stack Component Design" filed on Oct. 9, 2009, which is incorporated herein by reference.

When filled with electrolyte, one half-cell (e.g., 108 or 110) of redox flow cell 100 contains anolyte 126 and the other half-cell contains catholyte 124, the anolyte and catholyte being collectively referred to as electrolytes. Reactant electrolytes may be stored in separate tanks and dispensed into the cells 108 and 110 via conduits coupled to cell inlet/outlet (I/O) ports 112, 114 and 116, 118 respectively, often using an external pumping system. Therefore, electrolyte 124 flows into half-cell 108 through inlet port 112 and out through outlet port 114 while electrolyte 126 flows into half-cell 110 through inlet port 116 and out of half-cell 110 through outlet port 118.

At least one electrode 102 and 104 in each half-cell 108 and 110 provides a surface on which the redox reaction takes place and from which charge is transferred. Suitable materials for preparing electrodes 102 and 104 generally include those known to persons of ordinary skill in the art. Examples of electrodes 102 and 104 are also described in U.S. patent application Ser. No. 12/576,235, entitled "Magnetic Current Collector" filed on Oct. 8, 2009, which is incorporated herein by reference. Redox flow cell 100 operates by changing the oxidation state of its constituents during charging or discharging. The two half-cells 108 and 110 are connected in series by the conductive electrolytes, one for anodic reaction and the other for cathodic reaction. In operation (i.e., charge or discharge), electrolytes 126 and 124 (i.e., anolyte or catholyte) are flowed through half-cells 108 and 110 through I/O ports 112, 114 and 116, 118 respectively as the redox reaction takes place. Power is provided to a load 120 or received from power source 120, depending on if the flow cell battery is in discharging or charging mode, respectively.

Low-cost raw materials containing sources of chromium ions and/or iron ions are desirable in that they can be processed for use as redox battery electrolytes. Exemplary raw materials include chrome ores, partially reduced chromium ores, ferrochrome ores ($Fe_aCr_bSi_cC_dX_e$, wherein X denote impurities, and a-e each independently represent the % composition of the ore, which may differ depending on the ore's source), chromium metal, and iron metal. These raw materials generally contain impurities, such as sources of certain metal species. The removal of impurities may be desirable, as the presence of such impurities in redox electrolytes can increase unwanted side reactions in batteries and cells, resulting in, for example, increased hydrogen production and degradation of the electrolyte. For example, deposits of impurities may form at the cathode of a redox flow battery that utilizes an electrolyte containing certain ionic species. Impurities having a low hydrogen overpotential can serve to induce hydrogen gas generation, thus lowering the coulombic efficiency and causing an electrochemical imbalance of the redox reactants in the battery. Accordingly, an aspect of the methods described herein is to provide an aqueous redox electrolyte substantially free of certain metal impurities.

Figure 2:
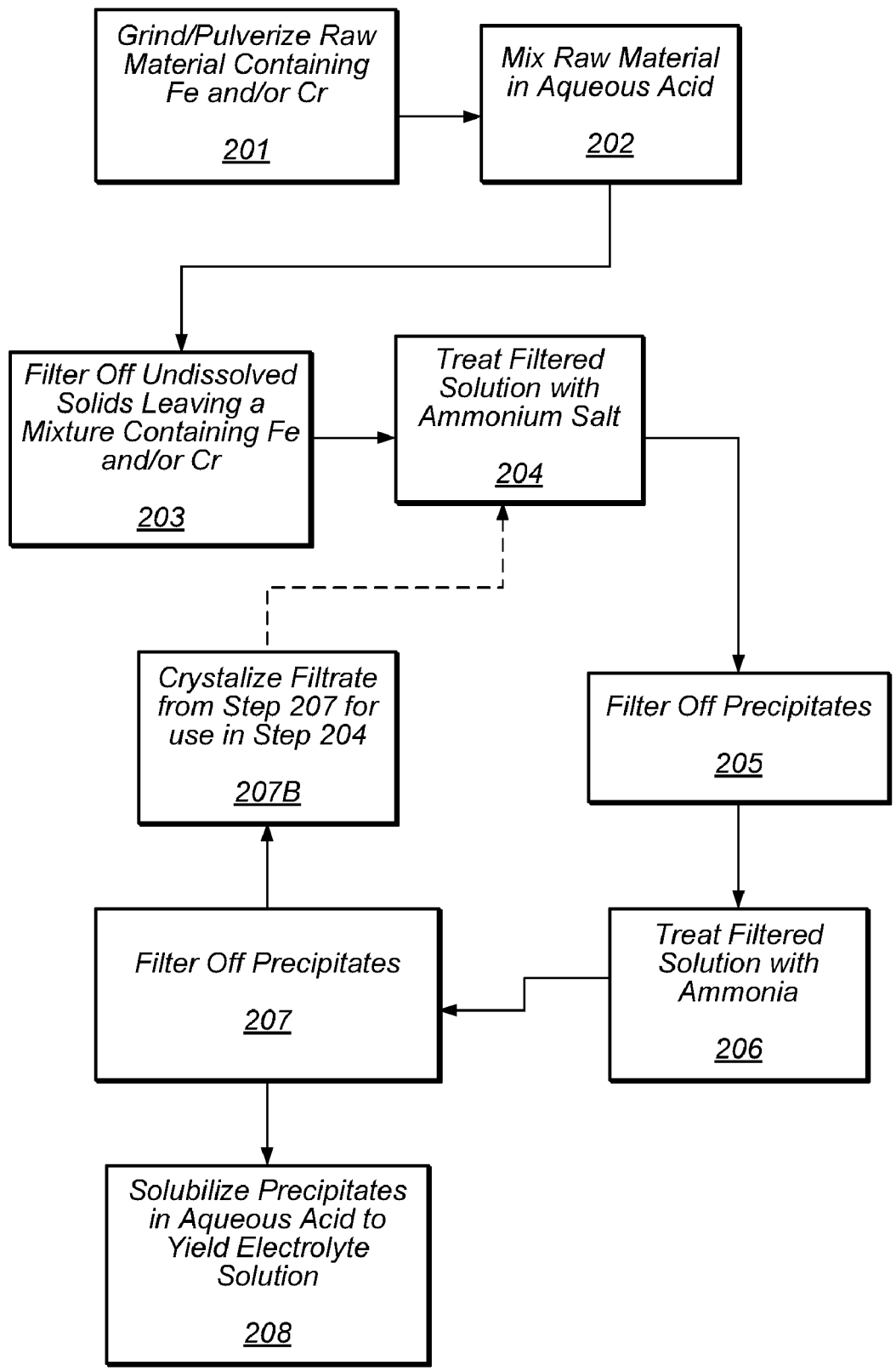
FIG. 2 illustrates a flow chart for the preparation of a redox electrolyte.

FIG. 2 illustrates an electrolyte production flow chart 200 consistent with the embodiments disclosed herein. In some embodiments, the raw material in step 201 is ground and/or pulverized to increase the surface area for optimal extraction. In step 202, the ground/pulverized raw material is dissolved/extracted in aqueous acid to form a solution containing chromium ions and/or iron ions. In certain embodiments, sulfuric acid ($H_2SO_4$) may be used. In some embodiments, $H_2SO_4$ may be partially replaced with other Bronsted acids such as, for example, hydrobromic acid, hydroiodic acid, hydrochloric acid, sulfonic acid, phosphoric acid, phosphonic acid, perchloric acid, carboxylic acids (e.g., acetic acid, citric acid, etc.), and mixtures thereof. In certain embodiments, a mixture of hydrochloric acid (HCl) and sulfuric acid may be used.

In some embodiments, the raw material described in FIG. 2 may further contain sources of certain impurities. Such impurities may include, but are not limited to, metal ions such as antimony, bismuth, cadmium, cobalt, copper, lead, manganese, molybdenum, niobium, nickel, titanium, tungsten, and zinc. In some cases, the raw material may contain sources of nickel ions, cobalt ions and/or copper ions. In some embodiments, the raw material is a ferrochrome alloy. In some embodiments, the raw material is chromium metal. In some embodiments, the raw material is chromium metal. In some embodiments, the raw material is iron metal or iron oxide. In some embodiments, the raw material is a mixture of ferrochrome alloy and iron metal. In some cases, the mixture of aqueous acid and raw materials may include from about 1 to about 5,000 ppm of nickel ions. In some embodiments, the mixture of aqueous acid and raw materials may include from about 50 to about 500 ppm of nickel ions. In some instances, the mixture of aqueous acid and raw materials may include from about 1 to about 1,000 ppm of cobalt ions. In some cases, the mixture of aqueous acid and raw materials may include from about 10 to about 50 ppm of cobalt ions. In some cases, the mixture of aqueous acid and raw materials may include from about 1 to about 1000 ppm of copper ions. In some cases, the mixture of aqueous acid and raw materials may include from about 10 to about 20 ppm of copper ions.

In certain circumstances, complete extraction of the raw material in step 202 may require grinding, pulverizing, stirring, and/or heating. In some cases, additional sources of preferred ions may be added to achieve the desired stoichiometric balance of ionic species. For example, iron (Fe)) powder, iron alloys, or other sources of iron ions may be mixed with the ground raw material prior to addition to the aqueous acidic solution to achieve the desired concentration of iron ions. The concentrations of the desired ions may be determined using known techniques such as ultraviolet-visible spectrophotometry, while the concentration of impurities can be determined using atomic absorption spectrometry and inductively coupled plasma mass spectrometry (ICP-MS).

Upon dissolution, any undissolved solids such as carbon and silica may be removed in step 203 by, for example, filtration. Suitable filtration methods include the use of solid filters having a mesh suitable for removing undissolved solids. Examples include, but are not limited to fine, medium, or coarse frit filter funnels with or without added filter aids such as Celite® or Celatom® FW-80 (Sigma-Aldrich). However, in some instances, filtration may not be necessary.

The filtered solution produced in step 203 is then treated with at least one ammonium salt in step 204. In some embodiments, the at least one ammonium salt comprises ammonium sulfate. In some embodiments, ammonia gas may be used to generate an ammonium salt, such as a sulfate salt, from the acidic mixture in situ. Upon addition, the ammonium salt will effect the precipitation of certain ionic impurities in the form of a double salt. The most common impurities in ferrochrome samples include nickel, cobalt and copper. In some instances, stirring or agitation of the solution may be necessary to achieve optimal precipitation. In one example, the addition of ammonium sulfate to a solution containing nickel ions will effect the precipitation of nickel ammonium sulfate $((NH_4)_2Ni(SO_4)_2)$.

Subsequent to precipitation of the certain impurities as double salts, the solution may be filtered to remove the double salts and any other precipitants in step 205 using standard filtering techniques. In some cases, certain desired ions in the raw material solution may also precipitate out of solution in the form of a double salt due to its partial insolubility. For example, the addition of ammonium sulfate to a raw material solution containing $Fe^{2+}$ and $Cr^{3+}$ may result in formation of double salts such as $(NH_4)_2Fe(SO_4)_2$ and $(NH_4)Cr(SO_4)_2$ respectively. However, while some double salts such as $(NH_4)Cr(SO_4)_2$ may be highly soluble in water, some salts such as $(NH_4)_2Fe(SO_4)_2$ may not. Thus, the addition of ammonium sulfate to the solution may result in the precipitation of some $(NH_4)_2Fe(SO_4)_2$. However, the concentration of $Fe^{2+}$ may be monitored by spectrophotometric methods. Any $Fe^{2+}$ lost in the precipitation of a double salt may be replaced by adding elemental iron during solubilizing step 208 described further below.

The removal of impurities such as nickel ions from solution will effectively reduce the formation of nickel deposits at the cathode, and thus reduce or substantially eliminate undesired side reactions such as, for example, the generation of hydrogen gas. In some embodiments, the amount of nickel ions may be reduced to about 10 ppm or less. In some embodiments, the amount of nickel ions may be reduced to about 1 ppm or less. In some embodiments, the amount of nickel ions may be reduced to about 10 ppb or less. In some embodiments, the amount of cobalt and copper ions may be reduced to about 10 ppm or less. In some embodiments, the amount of cobalt and copper ions may be reduced to about 10 ppb or less.

Once the precipitated double salts are removed from solution, the solution is treated with ammonia in step 206 to form an ammonium salt solution. The addition of ammonia to the solution will effect the formation of ammonium salts of certain oxides and hydroxides, which may be highly insoluble. For example, in solutions containing $(NH_4)_2Fe(SO_4)_2$ and $(NH_4)Cr(SO_4)_2$, the addition of ammonia to the solution will effect the formation and precipitation of certain insoluble species such as $Cr_2O_3 \cdot xH_2O$, $Cr(OH)_3$, and $Fe(OH)_2$. These insoluble species may then be filtered from the solution in step 207 for further processing in step 208. Suitable filtration methods include those mentioned earlier.

Alternatively, a base such as sodium hydroxide may be used to effect the precipitation of chromium and iron as their oxides and/or hydroxides. Calcium hydroxides can also be used for this process. Calcium sulfate which is precipitated along with chromium and iron hydroxides, can be removed by filtration in the next step when the hydroxides are redissolved in acid solutions.

The filtered ammonium salt solution may be subjected to crystallization in step 207B to retrieve the ammonium salt dissolved therein. This crystallization process may be used to "recycle" the ammonium salts of the solution. For example, in embodiments utilizing ammonium sulfate in the initial extraction step, crystallization may be used to effect the recovery of ammonium sulfate from the solution. Upon recovery, the ammonium sulfate may be recycled for use in subsequent purification processes at, for example, step 204. Suitable crystallization methods include the dissolution of the solid in water at above ambient temperature to generate a saturated solution and cooling the solution to form precipitates. In some embodiments, the saturated solution may be cooled to a temperature at or below ambient temperature.

The oxide and hydroxide precipitates filtered off in step 207 are then solubilized in step 208 to achieve the desired electrolyte solution. For example, raw material solutions containing $Fe^{2+}$ and $Cr^{3+}$ are precipitated from the ammonium salt solution in the form of $Cr_2O_3 \cdot xH_2O$, $Cr(OH)_3$, and $Fe(OH)_2$. These oxide and hydroxide precipitates are subsequently re-dissolved in an aqueous acid solution, such as aqueous hydrochloric acid. Once dissolved, the solution essentially comprises a pure redox flow electrolyte containing $CrCl_3$, $FeCl_2$, and aqueous HCl.

The resulting electrolyte may be used in a redox flow cell battery. In some embodiments, $FeCl_2$ and/or $CrCl_3$ may be added to the electrolyte to adjust the concentration of iron and/or chromium in the electrolyte to appropriate levels for use in a redox flow cell battery.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

In the examples below, the following abbreviations have the following meanings If an abbreviation is not defined, it has its generally accepted meaning.

mL=milliliters
L=liters
° C.=degrees Celsius
M=molarity
N=normality
ppm=parts per million
ppb=parts per billion
$N_2$=nitrogen gas
cm=centimeters
$HNO_3$=nitric acid
$PbCl_2$=lead chloride
Co=cobalt
Cu=copper
Ni=nickel
Hg=mercury
$HgCl_2$=mercuric chloride
DI=deionized
g=gram
hr=hour
rt=room temperature

EXAMPLES

Ferrochrome Extraction Procedure

Example 1

A 5L three-necked flask fitted with a reflux condenser, mechanical stirrer and a Teflon coated thermocouple was charged with 3 M $H_2SO_4$ (3000 mL). The reflux condenser was connected through a gas outlet adapter to Tygon tubing to vent the hydrogen gas in the fumehood. Ground ferrochrome (India, lot A408, 120 g, 18-35 mesh) was added to the acid in small quantities (ca 4 g) with constant stirring at 80 C. After the completion of addition, which took approximately 1 h, the reaction mixture was stirred for 9 h, gradually raising the temperature to 103 C and then filtered through a medium frit funnel using a water aspirator. The green filtrate (2820 mL, 3496 g) was analyzed by UV-VIS spectrophotometry for Cr(III) and Fe(II) concentrations which were found to be 0.56 M ($\lambda_{max}$ 584 nm) and 0.17 M ($\lambda_{max}$ 970 nm) respectively. The $H_2SO_4$ concentration was measured to be 2.14 M by titration against 1M NaOH (to a pH of 4.0). The concentrations of Co, Ni and Cu were measured by ICP-MS to be 27, 240 and 10 ppm respectively.

The amount of unreacted ferrochrome which was easily separable from the residue (due to its faster settling rate in water) was 0.14 g. The residue in the funnel was washed with water and methanol, dried in air under suction and collected (0.98 g).

Example 2

A 5 L three-necked flask fitted with a reflux condenser, mechanical stirrer and a Teflon coated thermocouple was charged with 5 M $H_2SO_4$ (1000 mL). The reflux condenser was connected through a gas outlet adapter to Tygon tubing to vent the hydrogen gas in the fumehood. Ground ferrochrome (India, lot A408, 40 g, 18-35 mesh) was added to the acid in small quantities (ca 4 g) with constant stirring at 90-100 C. After the completion of addition, which took approximately 1.5 h, iron powder (56 g, 325 mesh) was added in small quantities at 90.0 over 1 h. The reaction mixture was stirred for 6 h at 90-100.0 and then filtered through a medium frit funnel using a water aspirator. The green filtrate (2710 mL, 3717 g) was analyzed by UV-VIS spectrophotometry for Cr(III) and Fe(II) concentrations which were found to be 0.61 M ($\lambda_{max}$ 584 nm) and 0.49 M ($\lambda_{max}$ 970 nm) respectively. The $H_2SO_4$ concentration was measured to be 3.97 M by titration against 1M NaOH (to a pH of 4.0). The concentrations of Co, Ni and Cu were measured by ICP-MS to be 14, 110 and 4.8 ppm respectively.

The amount of unreacted ferrochrome, which was easily separable from the residue (due to its faster settling rate in water), was 2.0 g. The residue in the funnel was washed with water and methanol, dried in air under suction and collected (0.56 g).

Example 3

Following the procedure in Example 2 and using 4 M $H_2SO_4$, the impure electrolyte solution containing chromium, iron, sulfuric acid, cobalt, nickel and copper in the concentrations 0.61 M, 0.5 M, 2.93 M, 12 ppm, 100 ppm and 4.6 ppm respectively was obtained.

Example 4

Following the procedure in Example 2 and using 3.1 M $H_2SO_4$, the impure electrolyte solution containing chromium, iron, sulfuric acid, cobalt, nickel and copper in the concentrations 0.58 M, 0.46 M, 1.98 M, 12 ppm, 100 ppm and 4.6 ppm respectively was obtained.

Example 5

Following the procedure in Example 1 and using 4.9 M $H_2SO_4$, the impure electrolyte solution containing chromium, iron, sulfuric acid, cobalt, nickel and copper in the concentrations 0.6 M, 0.16 M, 4.09 M, 15 ppm, 300 ppm and 6.7 ppm respectively was obtained.

Example 6

Following the procedure in Example 1 and using 4 M $H_2SO_4$, the impure electrolyte solution containing chromium, iron, sulfuric acid, cobalt, nickel and copper in the concentrations 0.59 M, 0.16 M, 3.26 M, 24 ppm, 200 ppm and 9.9 ppm respectively was obtained.

Example 7

A 5 L three-necked flask fitted with a reflux condenser, mechanical stirrer and a Teflon coated thermocouple was charged with 5 M $H_2SO_4$ (3000 mL). The reflux condenser was connected through a gas outlet adapter to Tygon tubing to vent the hydrogen gas in the fumehood. Ground ferrochrome (India, lot A408, 200 g, 18-35 mesh) was added to the acid in small quantities (ca 4 g) with constant stirring at 90 C. After the completion of addition, which took approximately 2 h, the reaction mixture was stirred for 7 h, gradually raising the temperature to 103 C and then filtered through a medium frit funnel using a water aspirator. The green filtrate (2700 mL, 3775 g) was analyzed by UV-VIS spectrophotometry for Cr(III) and Fe(II) concentrations which were found to be 1.06 M ($\lambda_{max}$ 587 nm) and 0.3 M ($\lambda_{max}$ 970 nm) respectively. The $H_2SO_4$ concentration was measured to be 3.68 M by titration against 1M NaOH (to a pH of 4.0). The concentrations of Co, Ni and Cu were measured by ICP-MS to be 27, 240 and 10 ppm respectively.

The amount of unreacted ferrochrome which was easily separable from the residue (due to its faster settling rate in water) was 0.14 g. The residue in the funnel was washed with water and methanol, dried in air under suction and collected (0.98 g).

General Method for the Purification of the Ferrochrome Extract

1. Removal of Impurities by Co-Crystallization with Ammonium Sulfate

Example 8

A solution of the ferrochrome extract (100 mL) which was 0.72 M, 0.24 M and 2.06 M in $Cr^{3+}$, $Fe^{2+}$ and $H_2SO_4$ respectively, was treated with ammonium sulfate (40 g) with stirring in a water bath at 65 C. After the complete dissolution of the salt, the solution was allowed to cool gradually in the bath at a rate of 5 C/h. The solution was then allowed to cool at ambient temperature over a period of 9 days and then filtered through a medium frit funnel. The supernatant liquid was periodically analyzed by ICP-MS for the levels of $Co^{2+}$, $Ni^{2+}$, and $Cu^{2+}$ ions. After 9 days the levels of these ions dropped to 1.1, 0.84 and 1.0 ppm from their initial values of 16, 140 and 6.7 ppm respectively. The concentrations of $Cr^{3+}$ and $Fe^{2+}$ were measured by UV-VIS spectrophotometry to be 0.65 M and 0.17 M respectively.

2. Removal of Impurities by Co-Crystallization with Ammonium Sulfate Using NH3 Gas

Example 9

Ammonia gas was bubbled through the ferrochrome extract in sulfuric acid extract (1 L 1385 g), typically containing 0.62 M Cr(III), 0.47 M Fe(II) and 3.98 M sulfuric acid, with vigorous stirring and the pH was monitored using a pH meter. The bubbling of the gas was stopped when the pH reached 2.0 during which time the temperature rose to 87 C. The solution (1.05 L, 1407 g) was allowed to cool to ambient temperature (ca. 20.C). The process monitored following the levels are impurity ions such as Ni(II) in the supernatant liquid using ICP-MS. When the level of Ni(II) dropped below 1 ppm, the mixture was filtered and the filtrate (892 mL, 1174 g) containing ammonium sulfate, Cr(III) and varying amounts of Fe(II) was used for the next step.

3. Precipitation of Chromium and Iron Hydroxides

Example 10

In a typical experiment a 6 M NaOH solution was initially added rapidly to the filtrate (1 L) obtained above with vigorously stirring till the pH of the solution increased to 5.0 and then slowly. A gelatinous precipitate was formed when the pH reaches 6 and the addition of the base was continued till the pH rose to 7.3. The weight of the resulting mixture was 1805 g. The mixture was filtrated through a medium frit filter funnel under suction and the precipitate was washed with water (3×1000 mL) to get remove most of the ammonium sulfate and sodium sulfate salts. A greenish filter cake which contains mostly chromium hydroxide and water was obtained (525 g).

4. Preparation of the Purified Chromium Chloride Solution

Example 11

The precipitate obtained above was transferred to covered container and hydrogen chloride gas was bubbled through the mass till the solid dissolved to yield a solution. This process was continued till the acidity of the solution increased to the desired value (typically 2.5 M) as measured by pH titration. The composition of the solution was 1.8 M in $CrCl_3$ (400 mL).

5. Preparation of the Electrolyte Solution

Example 12

A solution of purified $CrCl_3$ (1.4 M, 420 mL) in 3.4 M HCl prepared by the method detailed above was treated with HCl (12 M, 30 mL). Iron chips (20.1 g; 0.36 mole) were added in small amounts. After the addition was complete, the mixture was stirred at ambient temperature overnight and heated under nitrogen for 2.5 h at 53-76 C. The mixture was cooled to ambient temperature and filtered through Celatom® FW-80. The concentration of the acid was adjusted to 2.63 M by passing HCl gas. The concentrations of $Cr^{3+}$ and $Fe^{2+}$ were measured by UV-VIS spectrophotometry to be 1.3 M and 1.0 M respectively.

Evaluation of Flow Cell Performance Using Purified Electrolyte

Example 13

A flow cell was constructed as shown in to FIG. 1. Ferrochrome solution purified by the preceding method and having the composition of 1.3 M $CrCl_3$, 1.0 M $FeCl_2$ and 2.63 M HCl was used as the electrolyte. Thermoset graphite foils in contact with carbon felts (29.2 mm thickness) were used as the electrodes. Daramic membrane (1 mm thickness) was used as the separator. The total volume of electrolyte in each compartment was roughly 150 mL. The charging current density was 40 mA/cm². Polarization measurement gave area resistivity values of 2.1 and 2.06 ohm cm² for charging and discharging respectively. Charge/discharge cycles were carried out within the state of charge limits of 20 and 80%. The columbic efficiency of the flow cell was near optimal (98-99%), due to the absence of any side-reactions, as compared to the cell that was constructed with an electrolyte prepared from commercial chromium chloride and ferrous chloride.

Precipitation of Chromium and Iron Hydroxides Using Calcium Hydroxide

Example 14

A solution of the chromium sulfate solution (0.94 M, 850 mL) was prepared following example 8 by passing ammonia gas into ferrochrome extract and removing the impurities by the selective crystallization procedure described above. Solid calcium hydroxide (93.2 g) was added slowly in small amounts with vigorous stirring, allowing the pH to rise and stabilize after each addition. The addition was stopped when the pH reached 7.6. The mixture was filtered through a medium frit funnel and the residue was washed with water (11×1000 mL). The pH of the filtrate was monitored after each wash till it dropped to 6.9. The residue was transferred to a beaker and HCl gas was passed slowly into the residue with stirring while the pH of the mixture was monitored using a pH meter. When the pH dropped to −0.5, the introduction of the gas was stopped. The mixture was filtered to remove calcium sulfate. The concentrations of $Cr^{3+}$ and $Fe^{2+}$ were measured by UV-VIS spectrophotometry to be 1.37 M and 0.09 M respectively. The acid concentration was determined by titration with base to be 3.81 M. The concentrations of there elements were measured by ICPMS. Co 0.37 ppm, Ni: 1.3 ppm, Cu 0.41 ppm, Ca 4300 pm, S 11000 ppm. The formulation of electrolyte was completed by adding the required amount of iron and HCl as outlined in Example 11.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for preparing a redox flow cell battery electrolyte, comprising:
    mixing a raw material comprising a transition metal and at least one ionic impurity, in at least one first aqueous acid to form a mixture comprising ions of the transition metal and at least one ionic impurity, wherein the transition metal is selected from the group consisting of chromium, iron, and a combination thereof;

subjecting the mixture to at least one ammonium salt, wherein at least one ionic impurity precipitates out of the mixture;

removing at least a portion of the precipitates from the mixture, to form a partially purified mixture of ions of the transition metal;

treating the partially purified mixture with ammonia, wherein at least a portion of ions of the transition metal in the partially purified mixture precipitate in the form of oxide and/or hydroxide salts;

removing at least a portion of the precipitated oxide and/or hydroxide salts from the partially purified mixture; and at least partially solubilizing the oxide and/or hydroxide salts by mixing the ions of the transition metal, in the form of oxide and/or hydroxide salts, in at least one second aqueous acid to form the electrolyte.

2. The method of claim 1, further comprising crystallizing an ammonium salt solution remaining after removal of the precipitated oxide and/or hydroxide salts from the partially purified mixture to form recycled ammonium salt.

3. The method of claim 2, further comprising using the recycled ammonium salt as a portion of the at least one ammonium salt to effect the precipitation of the at least one ionic impurity.

4. The method of claim 1, wherein removing at least a portion of the precipitates from the mixture comprises removing the precipitates by filtration.

5. The method of claim 1, removing at least a portion of the precipitated oxide and/or hydroxide salts from the partially purified mixture comprises removing the precipitates by filtration.

6. The method of claim 1, wherein mixing a raw material in at least one first aqueous acid further comprises adding elemental iron or an iron-containing alloy to the at least one first aqueous acid.

7. The method of claim 1, wherein at least partially solubilizing the oxide and/or hydroxide salts by mixing the ions of the transition metal in at least one second aqueous acid to form the electrolyte further comprises adding elemental iron to the at least one second aqueous acid.

8. The method of claim 1, wherein the first aqueous acid comprises sulfuric acid.

9. The method of claim 1, wherein the second aqueous acid comprises hydrochloric acid.

10. The method of claim 1, wherein the at least one ionic impurity comprises ions of at least one of copper, silver, tungsten, tin, lead, indium, molybdenum, vanadium, nickel, cobalt, thalium, cadmium, or noble metals.

11. The method of claim 1, wherein the at least one ionic impurity comprises nickel ions, cobalt ions, or copper ions.

12. The method of claim 1, wherein the at least one ionic impurity is nickel ions.

13. The method of claim 1, wherein the raw material comprises chrome ores, partially-reduced chrome ores, ferrochrome ores, iron metal or chromium metal.

14. The method of claim 1, further comprising introducing the electrolyte into a redox flow cell battery.

15. The method of claim 1, further comprising adding $FeCl_2$ to the electrolyte to adjust a concentration of iron in the electrolyte and adding $CrCl_3$ to the electrolyte to adjust a concentration of chromium in the electrolyte.

16. A method for purifying a raw material comprising a transition metal and at least one ionic impurity, comprising:

mixing the raw material in at least one first aqueous acid to form a mixture comprising ions of the transition metal and at least one ionic impurity, wherein the transition metal is selected from the group consisting of chromium, iron, and a combination thereof;

subjecting the mixture to at least one ammonium salt, wherein at least one ionic impurity precipitates out of the mixture;

removing at least a portion of the precipitates from the mixture, to form a partially purified mixture of ions of the transition metal;

treating the partially purified mixture with ammonia, wherein at least a portion of ions of the transition metal in the partially purified mixture precipitate in the form of oxide and/or hydroxide salts; and removing at least a portion of the precipitated oxide and/or hydroxide salts from the partially purified mixture.

17. The method of claim 16, further comprising crystallizing an ammonium salt solution remaining after removal of the precipitated oxide and/or hydroxide salts from the partially purified mixture to form recycled ammonium salt.

18. The method of claim 17, further comprising using the recycled ammonium salt as a portion of the at least one ammonium salt to effect the precipitation of the at least one ionic impurity.

19. The method of claim 16, wherein removing at least a portion of the precipitates from the mixture comprises removing the precipitates by filtration.

20. The method of claim 16, removing at least a portion of the precipitated oxide and/or hydroxide salts from the partially purified mixture comprises removing the precipitates by filtration.

21. The method of claim 16, wherein mixing a raw material in at least one first aqueous acid further comprises adding elemental iron or an iron-containing alloy to the at least one first aqueous acid.

22. The method of claim 16, wherein at least partially solubilizing the oxide and/or hydroxide salts by mixing the ions of the transition metal in at least one second aqueous acid to form the electrolyte further comprises adding elemental iron to the at least one second aqueous acid.

23. The method of claim 16, wherein the first aqueous acid comprises sulfuric acid.

24. The method of claim 16, wherein the at least one ionic impurity comprises ions of copper, silver, tungsten, tin, lead, indium, molybdenum, vanadium, nickel, cobalt, thalium, cadmium, or noble metals.

25. The method of claim 16, wherein the at least one ionic impurity comprises nickel ions, cobalt ions, or copper ions.

26. The method of claim 16, wherein the at least one ionic impurity is nickel ions.

27. The method of claim 16, wherein the raw material comprises chrome ores, partially-reduced chrome ores, ferrochrome ores, iron metal or chromium metal.

\* \* \* \* \*